(12) United States Patent
Baiocchi

(10) Patent No.: US 11,399,460 B1
(45) Date of Patent: Aug. 2, 2022

(54) BLADE ROTATION SYSTEM

(71) Applicant: Parker-Hannifin Corporation, Cleveland, OH (US)

(72) Inventor: Enrico Baiocchi, Naperville, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 362 days.

(21) Appl. No.: 16/404,827

(22) Filed: May 7, 2019

Related U.S. Application Data

(60) Provisional application No. 62/684,387, filed on Jun. 13, 2018.

(51) Int. Cl.
*H02K 49/10* (2006.01)
*A01D 34/80* (2006.01)
*H02K 9/19* (2006.01)

(52) U.S. Cl.
CPC ........... *A01D 34/80* (2013.01); *H02K 49/106* (2013.01); *H02K 9/19* (2013.01)

(58) Field of Classification Search
CPC .......... H02K 9/19; H02K 9/193; H02K 9/197; H02K 49/10; H02K 49/102; H02K 49/104; H02K 49/108; A01D 34/56; A01D 34/80; A01D 69/02; F04D 25/026; F04D 25/04; F04D 25/045
See application file for complete search history.

(56) References Cited

U.S. PATENT DOCUMENTS

| | | | | |
|---|---|---|---|---|
| 3,884,124 | A * | 5/1975 | Eddy | F01B 13/061 91/487 |
| 4,184,090 | A * | 1/1980 | Taiani | B63G 1/00 310/104 |
| 4,982,461 | A * | 1/1991 | Mikiya | A61H 33/6047 4/541.3 |
| 7,861,503 | B1 * | 1/2011 | Campbell | A01D 34/6806 56/17.5 |
| 8,708,678 | B2 * | 4/2014 | Muscarella | F04C 15/0088 418/206.1 |
| 2004/0105768 | A1 * | 6/2004 | Cameron | F04C 15/06 417/420 |
| 2005/0206260 | A1 * | 9/2005 | Akiyama | F27B 14/061 310/104 |
| 2005/0214152 | A1 * | 9/2005 | Citro | F01C 21/08 418/140 |
| 2006/0032225 | A1 * | 2/2006 | Dyne | F02B 37/10 60/607 |

(Continued)

FOREIGN PATENT DOCUMENTS

CN 201726299 U * 1/2011

*Primary Examiner* — Eric Johnson
(74) *Attorney, Agent, or Firm* — Renner, Otto, Boisselle & Sklar, LLP

(57) ABSTRACT

A blade rotation system including an hydraulic gear motor and a spindle shaft. The hydraulic gear motor has a drive shaft, and the drive shaft is configured with one or more first permanent magnets coupled thereto. The spindle shaft is adapted for connection to a blade, and the spindle shaft is configured with one or more second permanent magnets coupled thereto. The one or more first permanent magnets are configured to magnetically engage the one or more second permanent magnets so that rotation of the drive shaft by the hydraulic gear motor translates into rotation of the spindle shaft to impart motion to the blade.

11 Claims, 7 Drawing Sheets

(56) References Cited

U.S. PATENT DOCUMENTS

| | | | |
|---|---|---|---|
| 2010/0171382 A1* | 7/2010 | Hallberg | H02K 49/102 |
| | | | 310/113 |
| 2011/0211982 A1* | 9/2011 | Marks | F04D 29/426 |
| | | | 417/420 |
| 2014/0066214 A1* | 3/2014 | Flanigan | H02K 24/00 |
| | | | 464/29 |
| 2018/0106352 A1* | 4/2018 | Levin | F16H 39/36 |

* cited by examiner

BLADE ROTATION SYSTEM

FIELD OF INVENTION

The present invention relates generally to blade rotation systems, and more particularly to blade rotation systems that use an hydraulic gear motor driving means, such as may be used in the deck of a rotary blade turf mower.

BACKGROUND

Blade rotation systems such as may be used in rotary blade turf mowers or industrial fans, may employ a hydraulic gear motor as a driving means. In a rotary blade turf mower, such a blade rotation system may be provided for each blade or set of blades in a deck of the mower. A typical deck may have three blade rotation systems. The blade rotation system may include the blade, a spindle shaft rotatably mounted to drive the blade, and the hydraulic gear motor. An output drive shaft of the hydraulic gear motor is connected to spindle shaft to drive the spindle shaft.

Hydraulic fluid may be circulated to and through a bore in the hydraulic gear motor housing to lubricate and cool the drive shaft and its support bearings. Hydraulic fluid control means may be provided to prevent leakage of hydraulic fluid from the shaft-bore interface. Typically a dynamic shaft seal such as a lip seal is used to seal the drive shaft relative to an inner periphery of the bore. A hydraulic fluid passage branches off the bore to a case drain of the hydraulic gear motor. The hydraulic fluid passage discharges hydraulic from behind the shaft seal and downstream to the case drain to reduce pressure build-up behind the shaft seal. A case drain hose is connected to the case drain to communicate the hydraulic fluid from the outlet of the hydraulic fluid passage to a hydraulic fluid reservoir.

For some blade rotation systems, there remain various shortcomings, drawbacks, and disadvantages relative to certain applications. For example, in the above described turf industry systems the shaft seal may leak due to excessive wear of the shaft seal and/or hydraulic fluid pressure spikes. After prolonged hours of use, the hydraulic gear motor internally can have wear on the bushings that support the gear system, or wear on the balancing plate, either or both of which can lead to increased pressure and wear against the shaft seal. The excessive use causes internal wear in the hydraulic gear motor, eventually causing a failure in the shaft seal. Also, when the blade experiences a high impact load, such as by striking a rock or a piece of wood, the blade may jerk the spindle shaft and the hydraulic gear motor, which can cause shaft seal damage and leakage or even gear shaft or spindle shaft breakage and/or internal damage to the hydraulic gear motor. These shaft seal leaks and failures are common in the turf industry. The shaft seal also requires extra components of a case drain hose and connecting hardware, which itself is subject to wear and maintenance, adds to system costs, and, in the example of a turf mower, consumes already limited space in the area above the blade deck.

Accordingly, there remains a need for further contributions in this area of technology.

SUMMARY OF INVENTION

The present invention is directed to a blade rotation system that incorporates a magnetic coupling. The blade rotation system obviates the need for a shaft seal and thus a case drain, and also provides a torque limiter function corresponding to magnetic attraction of the permanent magnets that make up the magnetic coupling. According to one aspect of the invention, a blade rotation system includes an hydraulic gear motor having a drive shaft, the drive shaft being configured with one or more first permanent magnets coupled thereto; a spindle shaft adapted for connection to a blade, the spindle shaft being configured with one or more second permanent magnets coupled thereto; wherein the one or more first permanent magnets are configured to magnetically engage the one or more second permanent magnets so that rotation of the drive shaft by the hydraulic gear motor translates into rotation of the spindle shaft to impart motion to the blade.

Embodiments of the invention may include one or more of the following additional features separately or in combination.

The one or more first permanent magnets may be radially spaced from the one or more second permanent magnets.

The one or more first permanent magnets may be coupled to the drive shaft by a drive rotor, and the one or more second permanent magnets may be coupled to the spindle shaft by a driven rotor, such that the drive rotor magnetically drives the driven rotor.

The one or more first permanent magnets may be mounted to an outer periphery of the drive rotor, and the one or more second permanent magnets may be mounted to an inner periphery of the driven rotor.

The one or more first permanent magnets may be arranged in a first circular shape and the one or more second permanent magnets may be arranged in a second circular shape, and the second circular shape may be radially outward of the first circular shape.

The blade rotation system may further include a cup shape chamber, and the one or more first permanent magnets may project axially into an open end of the cup shape chamber.

The cup shape chamber may have an axially protruding tubular portion with the open end at one axial end of the tubular portion and a wall at an opposite axial end of the tubular portion. The peripheral edge of the open end may be fixed relative to an end wall of the hydraulic gear motor to seal the one or more first permanent magnets from the driven rotor and the one or more second permanent magnets.

The cup shape chamber may include a flow passage for receiving a cooling fluid to cool the cup shape chamber.

The flow passage may be in fluid communication with an open space surrounding a portion of the drive shaft and the cooling fluid may come from a gear housing of the hydraulic gear motor.

The hydraulic gear motor may include an inlet port and an outlet port through which pressurized hydraulic fluid is passed to drive the hydraulic gear motor. The inlet port and outlet port may be the only hydraulic fluid passages in the hydraulic gear motor.

The drive shaft of the hydraulic gear motor may not have a shaft seal.

The hydraulic gear motor may not have a case drain.

The one or more first permanent magnets may be configured to disengage from the one or more second permanent magnets when a maximum rated torque is achieved.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
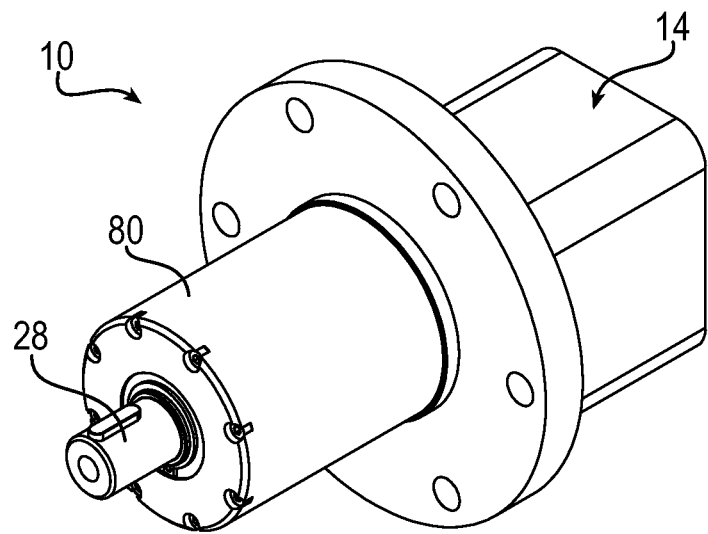
FIG. 1 is a perspective view of a blade rotation system in accordance with the invention.
Figure 2:
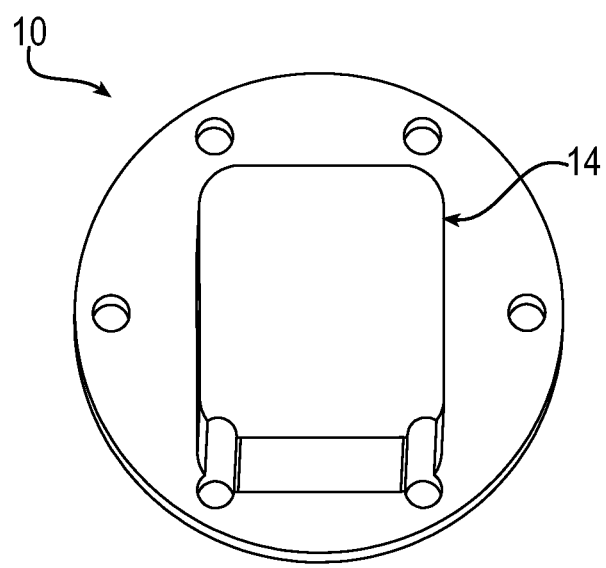
FIG. 2 is an end view of the FIG. 1 blade rotation system.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

The principles of the present invention have particular application to blade rotation systems for rotary blade turf mowers, and thus will be described below chiefly in this context. It will of course be appreciated, and also understood, that principles of this invention may be applicable to other applications where it is desirable to impart rotation to a blade or set of blades, such as in industrial fan applications or industrial blower applications.

Figure 3:
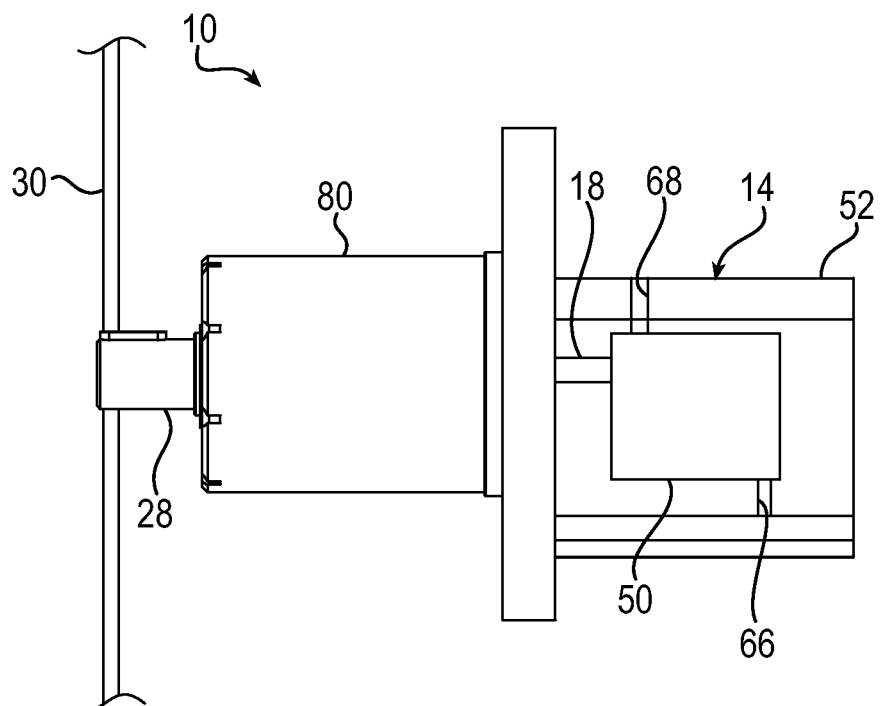
FIG. 3 is a partial block diagram and partial schematic representation of a blade rotation system in accordance with the invention.
Figure 4:
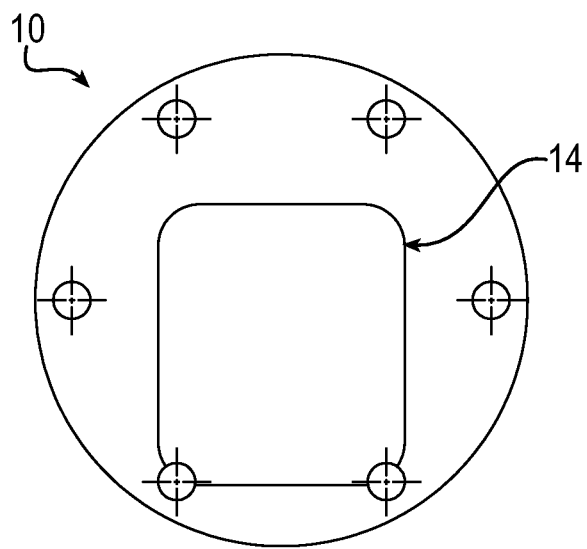
FIG. 4 is an end view of the FIG. 3 blade rotation system.
Figure 5:
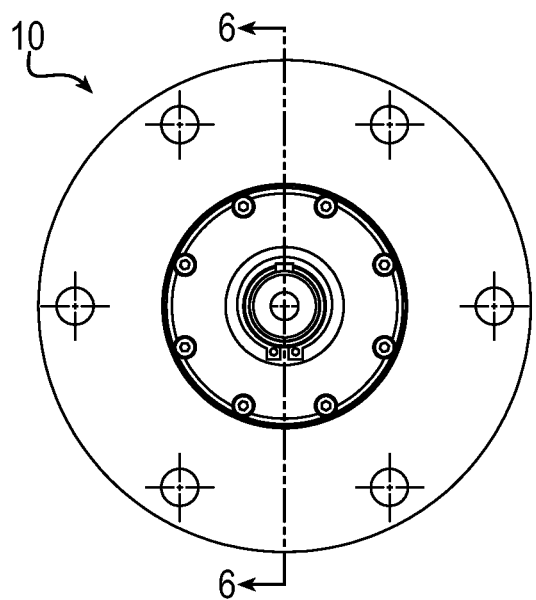
FIG. 5 is an end view of the FIG. 3 blade rotation system that is opposite that of FIG. 4.
Figure 6:
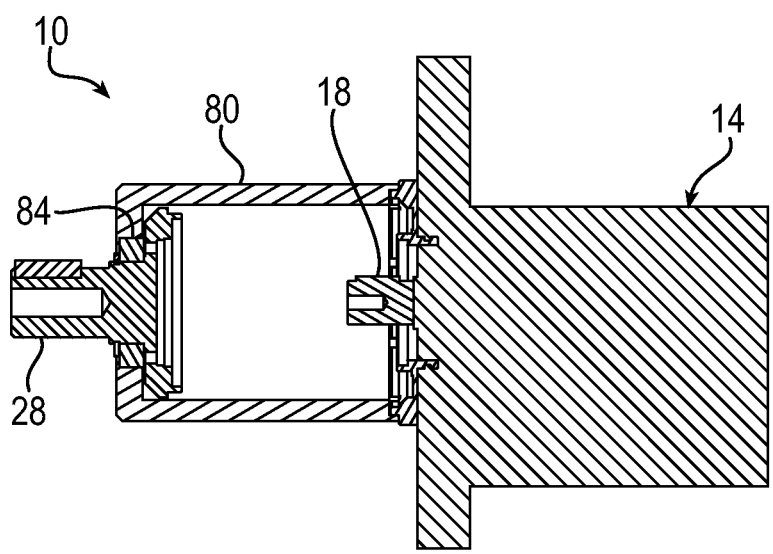
FIG. 6 is a cross-section view of the FIG. 3 blade rotation system, as shown from the plane A-A in FIG. 5, with the interior components of the spindle housing omitted for clarity.
Figure 7:
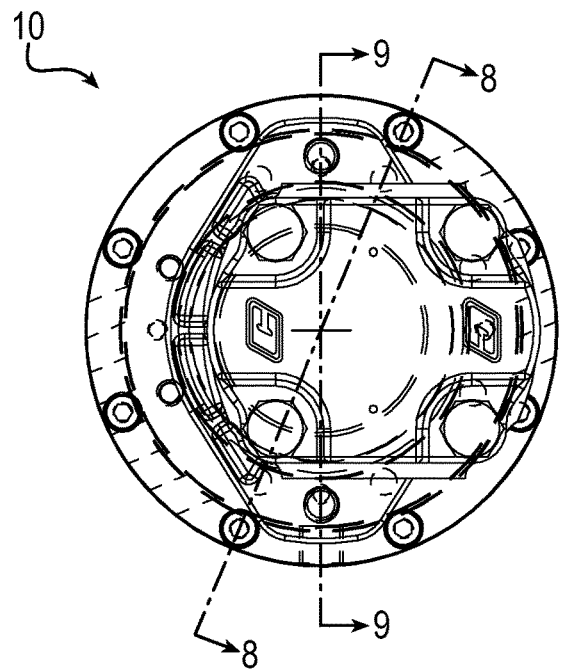
FIG. 7 is an end view of a blade rotation system in accordance with the invention.

FIGS. 1-10 show a blade rotation system 10 according to an embodiment of the invention. The blade rotation system 10 includes an hydraulic gear motor 14 having a drive shaft 18, and a spindle shaft 28 adapted for connection to a blade 30, such as a mower blade of a rotary blade turf mower. In FIG. 3, a single blade 30 is shown, it being understood that any number of blades, or set of blades, may be attached to the spindle shaft 28. The drive shaft 18 is configured with one or more first permanent magnets 36 coupled thereto, and similarly the spindle shaft 28 is configured with one or more second permanent magnets 46 coupled thereto. As will be described in greater detail below, the first permanent magnets 36 are configured to magnetically engage the second permanent magnets 46 so that rotation of the drive shaft 18 by the hydraulic gear motor 14 translates into rotation of the spindle shaft 28 to impart motion to the blade 30. It will be appreciated that, unlike in prior systems, the blade rotation system 28 of the present invention does not require a shaft seal used on the drive shaft 18 at the shaft-bore interface. The magnetic coupling provided by the first and second permanent magnets 36, 46 eliminates the need for the hydraulic gear motor 14 shaft seal and the problems associated with such a shaft seal. Also, since there is no need for a shaft seal, the case drain and any associated case drain hardware can also be eliminated.

FIG. 3 shows a partial block diagram and partial schematic representation of the hyrdraulic gear motor 14. The hydraulic gear motor 14 includes a gear system 50 housed in a gear housing 52, an hydraulic fluid inlet port 66 and outlet port 68 in fluid communication with the gear system 50, and the output drive shaft 18. As there is no need for the shaft seal and consequently the case drain and case drain hose, the inlet port 66 and outlet port 68, in some applications, may be the only hydraulic fluid passages in the hydraulic gear motor 14. The drive shaft 18 is magnetically coupled to the spindle shaft 28 as described in greater detail below. A spindle housing 80 is attached to the gear housing 52 and houses the spindle shaft 28 and the magnetic coupling components. Suitable bearings 84, one shown in FIG. 6 and two shown in FIGS. 8 and 9, may be used to rotatably support the spindle shaft 28 at various lengths along the spindle shaft 28. A suitable bearing 86, shown in FIGS. 8 and 9, may be used to rotationally support the drive shaft 18. As will be appreciated, as pressurized hydraulic fluid passes from the inlet port 66 to the outlet port 68 of the gear housing 52, the hydraulic fluid drives the gear system 50, which in turn rotates the drive shaft 18 and thus the spindle shaft 28 to which it is magnetically coupled. Hydraulic fluid may also be communicated from the gear housing 52 to the spindle housing 80 to lubricate or cool the drive shaft bearing 86 and/or one or more magnetic coupling components.

In a rotary blade turf mower application, each blade rotation system 10 of the turf mower deck can employ an hydraulic gear motor 14 magnetically coupled to a spindle shaft 28. The hydraulic gear motors 14 typically will be connected in series so that a total hydraulic fluid pressure of for example 3000 psi would operate three hydraulic gear motors 14. Thus, for example, if each motor requires a 1000 psi delta P to operate properly, that is to rotate the blade(s) and cut the turf, the last motor in series from the hydraulic pressure source would experience 0-1000 psi, the second motor would experience 1000-2000 psi, and the first motor would experience 2000-3000 psi. The inlet pressure coming into the first motor would therefore be 3000 psi. Each of the hydraulic gear motors 28 requires a hydraulic fluid inlet port 66 and outlet port 68, and each spindle shaft 28 is equipped with a magnetic coupling that, if desired, can be configured without a shaft seal and any associated case drain and/or case drain hose.

Figure 8:
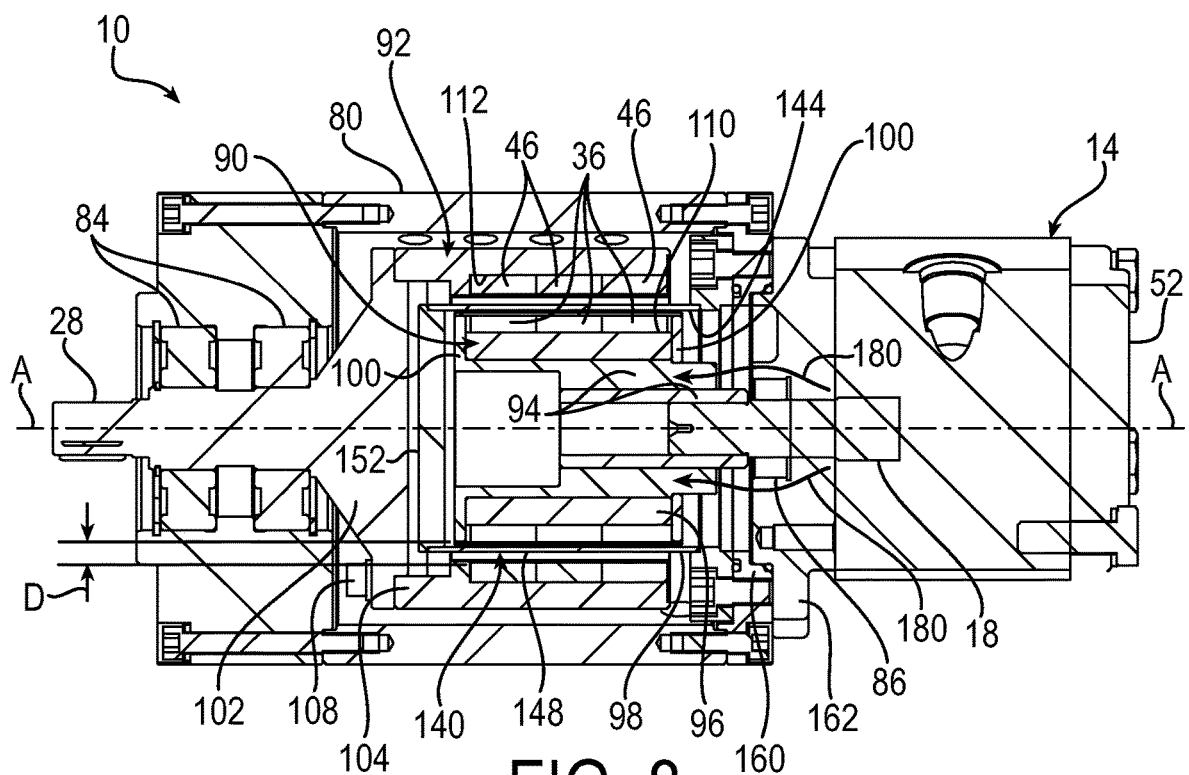
FIG. 8 is a cross-section view of the FIG. 7 blade rotation system, as shown from the plane A-A in FIG. 7.
Figure 9:
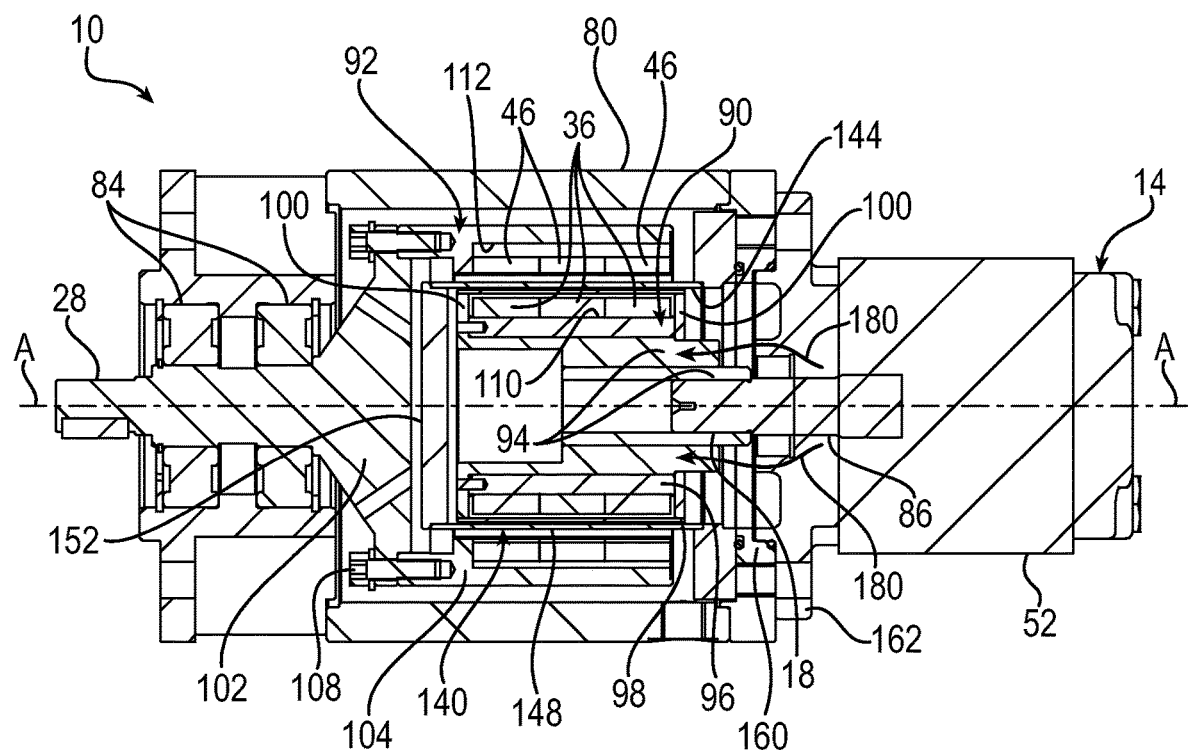
FIG. 9 is a cross-section view of the FIG. 7 blade rotation system, as shown from the plane E-E in FIG. 7.
Figure 10:
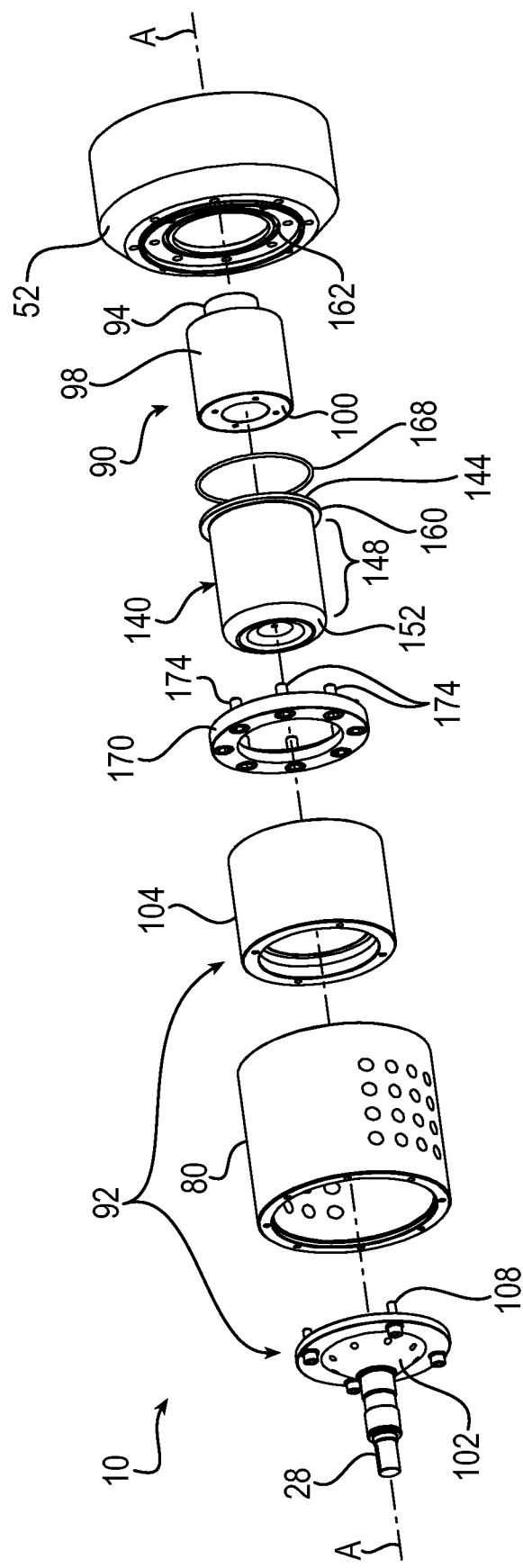
FIG. 10 is an exploded perspective view showing some of the components that make up the FIG. 7 blade rotation system.

Referring to FIGS. 8-10, the first permanent magnets 36 are coupled to the drive shaft 18 by a drive rotor 90, and the second permanent magnets 46 are coupled to the spindle shaft 28 by a driven rotor 92, such that the drive rotor 90 magnetically drives the driven rotor 92. Thus, the forces of the first permanent magnets 36 will drive the second permanent magnets 46, north to south pole. Anytime the first permanent magnets 36 move, the second permanent magnets 46 will follow. As the hydraulic gear motor 14 spins, the spindle shaft 28 will spin too via means of the magnetic attraction between the first permanent magnets 36 and the second permanent magnets 46. As indicated in FIG. 8, the first permanent magnets 36 are radially spaced from the second permanent magnets 46 by a distance D, so that there is no mechanical driving component or linkage between the spindle shaft 28 and the gear motor drive shaft 18.

The drive and driven rotors 90, 92 have a drum shape and are disposed on a common rotation axis A-A. The drive rotor 90 has a drive shaft receiving portion 94 and an annular magnet carrying portion 96. The drive shaft receiving portion 94 is configured to receive a distal end of the drive shaft 18 and rotationally lock to the drive shaft 18 as by a key, spline, or the like. The magnet carrying portion 96 is fastened to or structurally integral with the drive shaft receiving portion 94 and carries the first permanent magnets 36. A circumferential sleeve 98 may be provided to surround the first permanent magnets 36. Annular shape end plates 100 may be fastened to opposite axial ends of the magnet carrying portion 94 which, together with the circumferential sleeve 98, serve to encapsulate the first permanent magnets 36.

The driven rotor 92 includes the spindle shaft 28 and has a conical shape transition portion 102 and an annular magnet carrying portion 104. The conical shape transition portion 102 connects the spindle shaft 28 to the annular magnet carrying portion 104. In the illustrative embodiment, the conical shape transition portion 102 is structurally integral with the spindle shaft 28, although it will be appreciated that the conical shape transition portion 102 and spindle shaft 28 may be separate components connected to one another by suitable fastening means. The magnet carrying portion 104 is connected to the conical shape transition portion 96 by fasteners 108 and carries the second permanent magnets 46. Of course, the conical shape transition portion 102 could alternately be structurally integral with the annular magnet carrying portion 104.

The first permanent magnets 36 are mounted to an outer periphery 110 of annular magnet carrying portion 96 of the drive rotor 90, and the second permanent magnets 46 are mounted to an inner periphery 112 of the annular magnet carrying portion 104 of the driven rotor 92. As will be appreciated, the first permanent magnets 36 are arranged in the drive rotor 90 in a first circular shape in axial cross section and the second permanent magnets 46 are arranged in the driven rotor 92 in a second circular shape in axial cross section. The second circular shape is radially outward of the first circular shape by the distance D. In the illustrative embodiment, there are three axially adjacent first permanent magnets 36 and three axially adjacent second permanent magnets 46, and the first permanent magnets 36 are axially aligned with respect to the second permanent magnets 46.

The magnetic drive coupling can be configured to provide any desired torque. The torque requirements for a particular type of application, whether a rotary blade turf mower, industrial fan, blower fan, or other type of application, will determine the quantity and arrangement of the rotors 90, 92 and permanent magnets 36, 46, the dimensions of the rotors 90, 92 and permanent magnets 36, 46, and the material of the rotors 90, 92 and the permanent magnets 36, 46. In this regard, it will be appreciated that the illustrative embodiment of radially spaced drum type rotors and axially aligned magents is merely exemplary and other embodiments are contemplated. Thus, for example, in an alternate embodiment, a blade rotation system may include axially spaced disk type rotors and radially aligned first and second permanent magnets.

The first permanent magnets 36 are configured to disengage from the second permanent magnets 46 when a maximum rated torque is achieved. Thus, when the maximum rated torque is achieved, the hydraulic gear motor 14 is disengaged from the spindle shaft 28 and thus the blade 30. In this way, the magnetic coupling provides an automatic torque limiter that can prevent failure of the drive shaft 18 of the hydraulic gear motor 14. Thus, for example, when the blade 30 of a rotary blade turf mower experiences a high impact load, such as by striking a rock or a piece of wood, causing the blade 30 to jerk the spindle shaft 28, instead of the impact being transmitted through a mechanical coupling to the hydraulic gear motor as in prior systems, the impact is quickly attenuated through the driven rotor 92 without any effect on the hydraulic gear motor 14. The reason for this, is that upon impact of the blade 30 with the rock or other heavy object, the magnetic coupling will have reached its maximum rated torque and thus decoupled the driven rotor 92 from the drive rotor 90 and thus the hydraulic gear motor 14. This automatic decoupling that is built into the first and second permanent magnets 36, 46 therefore can prevent spindle shaft 28 breakage and/or internal damage to the hydraulic gear motor 14. Of course, once the hydraulic gear motor 14 has stopped, the first and second permanent magnets 36, 46 will automatically go in-line and reconnect owing to the above described magnetic attraction and be able to transfer the same torque as before an impact without any failure. Further, as noted above, over time the components of the present embodiment do not wear down as rapidly as in prior systems that rely on mechanical transfer of torque.

Referring again to FIGS. 8-10, the blade rotation system 10 may also include a cup shape chamber 140 to seal the first and second magnets 36, 46 from one another. The first permanent magnets 36 project axially into an open end 144 of the cup shape chamber 140. The cup shape chamber 140 has an axially protruding tubular portion 148 with the open end 144 at one axial end of the tubular portion 148 and a wall 152 at an opposite axial end of the tubular portion 148. A peripheral edge 160 of the open end 144 is fixed relative to an end wall 162 of the hydraulic gear motor 14 to seal the first permanent magnets 36 from the driven rotor 92 and the second permanent magnets 46. Referring to FIG. 10, an O-ring 168 may be disposed between the peripheral edge 160 and the end wall 162 to aid in the sealing. An annular disk 170 may be fastened to the end wall 162 via suitable fasteners 174 to secure and seal the cup shape chamber 140 to the hydraulic gear motor 14.

The cup shape chamber 140 may include one or more flow passages, indicated by arrows 180 in FIGS. 8 and 9, for receiving a cooling fluid to cool the cup shape chamber 140. The cooling fluid assists in cooling down the cup shape chamber 140 and thus the first and second permanent magnets 36, 46. Since the magnetic forces of the magnets are influenced by temperature, in particular torque can deteriorate under high temperatures, the cooling fluid can aid in reducing such high temperatures. Of course, where the blade rotation system 10 is not expected to be operated in a manner that would yield higher temperatures in the first and second permanent magnets 36, 46 then the cooling fluid can be omitted, as can the cup shape chamber 140.

In the illustrative embodiment, the flow passage 180 is in fluid communication with an open space surrounding a portion of the drive shaft 18. The cooling fluid can come from the gear housing 52 of the hydraulic gear motor 14. For example, for an hydraulic gear motor 14 that ordinarily is configured with a shaft seal, without a shaft seal in such a hydraulic gear motor, hydraulic fluid can be directed to flow along the drive shaft 18 downstream and into the cup shape chamber 140. Thus, a relatively small portion of the hydraulic fluid used for driving the gear system 50 can be circulated through the cup shape chamber 140. Other embodiments are also contemplated. For example, an hydraulic passage separate from the drive shaft 18, or even separate from the hydraulic gear motor 14, may be provided to communicate cooling fluid to the cup shape chamber 140, whether from the hydraulic fluid reservoir or another source.

Figure 11:
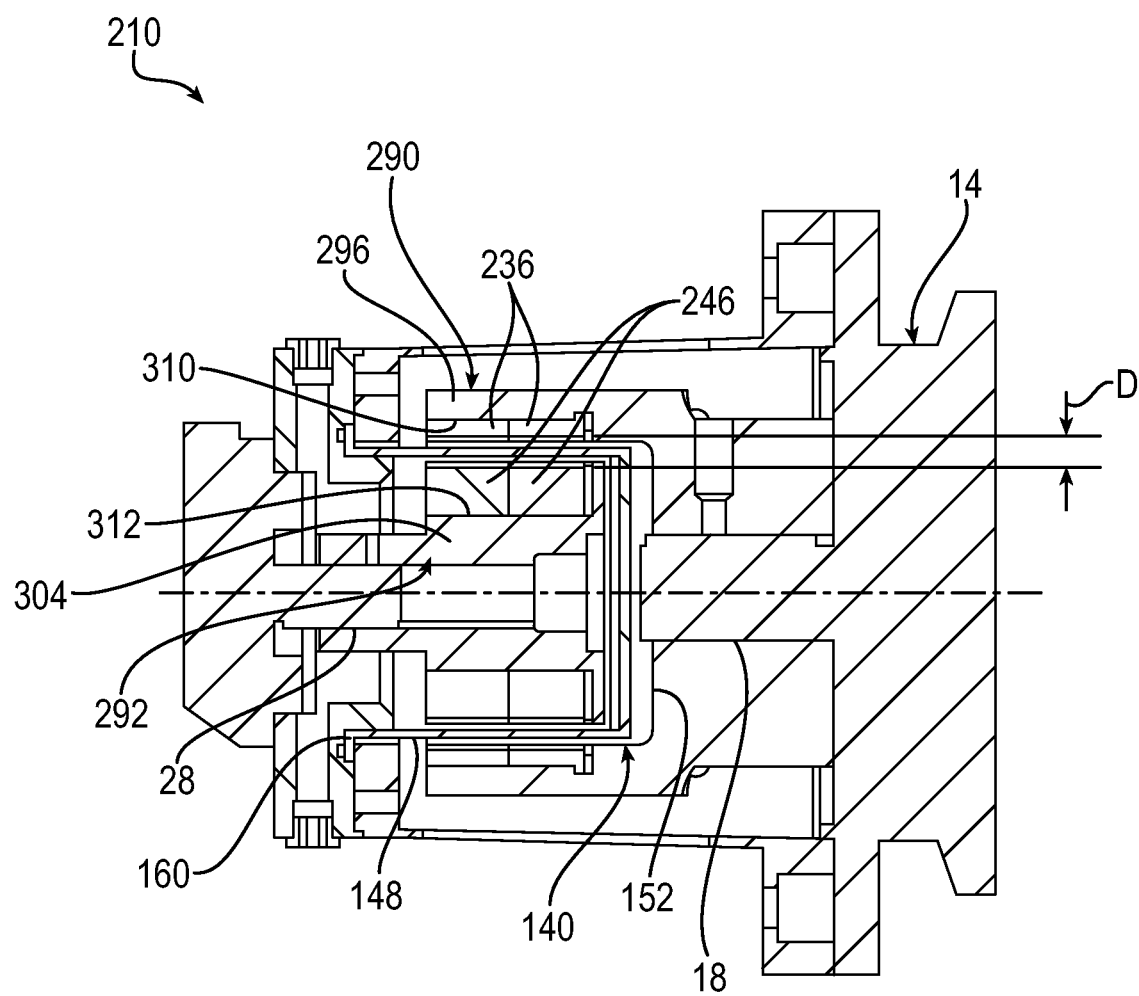
FIG. 11 is a cross-section view of a blade rotation system in accordance with an alternate embodiment of the invention.

FIG. 11 shows an alternate blade rotation system 210 in accordance with another embodiment of the invention. The blade rotation system 210 in FIG. 11 is in many respects similar to the above-referenced FIGS. 1-10 blade rotation system, and consequently the same reference numerals but indexed by 200, respectively, are used to denote structures corresponding to similar structures in the FIGS. 1-10 blade rotation system 10. In addition, the foregoing description of the FIGS. 1-10 blade rotation system 10 is equally applicable to the blade rotation system 210 in FIG. 11 except as noted below. Moreover, it will be appreciated upon reading and understanding the specification that aspects of the blade rotation systems 10, 210 may be substituted for one another or used in conjunction with one another where applicable.

The blade rotation system 210 includes an hydraulic gear motor 14 having a drive shaft 18, and a spindle shaft 28 adapted for connection to a rotating member such as a mower blade of rotary blade turf mower. The drive shaft 18 is configured with one or more first permanent magnets 236 coupled thereto, and similarly the spindle shaft 28 is configured with one or more second permanent magnets 246 coupled thereto. The first permanent magnets 236 are configured to magnetically engage the second permanent magnets 246 so that rotation of the drive shaft 18 by the hydraulic gear motor 14 translates into rotation of the spindle shaft 28 to impart motion to for example a blade.

As indicated in FIG. 11, the first permanent magnets 236 are radially spaced from the second permanent magnets 246 by a distance D, so that there is no mechanical driving component or linkage between the spindle shaft 28 and the gear motor drive shaft 18. The first permanent magnets 236 are mounted to an inner periphery 310 of an annular magnet carrying portion 296 of a drive rotor 290, and the second permanent magnets 246 are mounted to an outer periphery 312 of an annular magnet carrying portion 304 of a driven rotor 292. As will be appreciated, the first permanent magnets 236 are arranged in the drive rotor 290 in a first circular shape in axial cross section and the second permanent magnets 246 are arranged in the driven rotor 292 in a second circular shape in axial cross section. The second circular shape is radially inward of the first circular shape by the distance D. In the illustrative embodiment, there are two axially adjacent first permanent magnets 236 and two axially adjacent second permanent magnets 246, and the first permanent magnets 236 are axially aligned with respect to the second permanent magnets 246.

As will be appreciated, the blade rotation system 10 of the present application has particular advantages over prior systems. One of the main issues with prior blade rotation systems is the leak from the shaft seal area of the hydraulic gear motor, because the motors work in series. The rotary blade turf mower industry is particularly sensitive to such leaks of the hydraulic gear motors moving the blades. The use of a shaft seal, such as a lip seal, forces the need for a case drain and case drain hose for each hydraulic gear motor to discharge the shaft seal area to prevent leaks and failures. As noted above, failure can still occur even with the use of a case drain line. The blade rotation system 10 according to the present disclosure replaces the dynamic seal, i.e. lip seal, with a static seal, i.e. a magnetic coupling. This magnetic coupling provides the advantage of achieving a leak-free environment in all situations from the motor shaft.

Also, removal of the case drain line provides the additional advantage of making the rotary blade turf mowers leaner in the bill of materials. As described above, the blade rotation system 10 can be configured without a case drain line. The rotary blade turf mower industry has met with no success in attempts to rid the mower of case drain lines, the reason being that so long as the mower has a shaft seal the mower needs a case drain line. The blade rotation system 10 of the present invention can be configured as a drainless system without the need for a case drain line, or as a drain line system that includes a case drain line.

Another advantage of the blade rotation system 10 is the magnetic coupling. The magnetic coupling automatically disengages when a maximum rated torque is achieved. This introduces an automatic torque limiter that can prevent shaft failure.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A blade rotation system, comprising:
   an hydraulic gear motor having a drive shaft, the drive shaft being configured with one or more first permanent magnets coupled thereto;
   wherein the hydraulic gear motor includes a gear system, and an inlet port and outlet port in fluid communication with the gear system and through which pressurized hydraulic fluid is passed to drive the hydraulic gear motor;
   a spindle shaft adapted for connection to a blade, the spindle shaft being configured with one or more second permanent magnets coupled thereto;
   wherein the one or more first permanent magnets are configured to magnetically engage the one or more second permanent magnets so that rotation of the drive shaft by the hydraulic gear motor translates into rotation of the spindle shaft to impart motion to the blade;
   wherein the hydraulic gear motor is configured such that as the pressurized hydraulic fluid passes from the inlet port to the outlet port, the hydraulic fluid drives the gear system to rotate the drive shaft and thus the spindle shaft to which the drive shaft is magnetically engaged; and
   a cup shape chamber, wherein the one or more first permanent magnets project axially into an open end of the cup shape chamber;
   wherein the cup shape chamber includes a flow passage for receiving a cooling fluid to cool the cup shape chamber.

2. The blade rotation system of claim 1, wherein the one or more first permanent magnets are radially spaced from the one or more second permanent magnets.

3. The blade rotation system of claim 1, wherein the one or more first permanent magnets are coupled to the drive shaft by a drive rotor, and the one or more second permanent magnets are coupled to the spindle shaft by a driven rotor, such that the drive rotor magnetically drives the driven rotor.

4. The blade rotation system of claim 3, wherein the one or more first permanent magnets are mounted to an outer periphery of the drive rotor, and the one or more second permanent magnets are mounted to an inner periphery of the driven rotor.

5. The blade rotation system of claim 4, wherein the one or more first permanent magnets are arranged in a first circular shape and the one or more second permanent magnets are arranged in a second circular shape, and the second circular shape is radially outward of the first circular shape.

6. The blade rotation system of claim 1, wherein the cup shape chamber has an axially protruding tubular portion with the open end at one axial end of the tubular portion and a wall at an opposite axial end of the tubular portion, wherein the peripheral edge of the open end is fixed relative to an end wall of the hydraulic gear motor to seal the one or more first permanent magnets from the driven rotor and the one or more second permanent magnets.

7. The blade rotation system of claim 1, wherein the flow passage is in fluid communication with an open space surrounding a portion of the drive shaft and the cooling fluid comes from a gear housing of the hydraulic gear motor.

8. The blade rotation system of claim 1, wherein the inlet port and outlet port are the only hydraulic fluid passages in the hydraulic gear motor.

9. The blade rotation system of claim 1, wherein the drive shaft of the hydraulic gear motor does not have a shaft seal.

10. The blade rotation system of claim 1, wherein the hydraulic gear motor does not have a case drain.

11. The blade rotation system of claim 1, wherein the one or more first permanent magnets are configured to disengage from the one or more second permanent magnets when a maximum rated torque is achieved.

\* \* \* \* \*